United States Patent [19]

Karr

[11] 4,249,309
[45] Feb. 10, 1981

[54] ROTATING NIBBLER APPARATUS
[75] Inventor: Edward J. Karr, West Chicago, Ill.
[73] Assignee: B. W. Darrah, Inc., Carol Stream, Ill.
[21] Appl. No.: 59,944
[22] Filed: Jul. 23, 1979
[51] Int. Cl.³ ............................................. B23D 27/00
[52] U.S. Cl. ...................................... 30/240; 83/916; 30/233
[58] Field of Search ......................... 30/228, 240, 233; 83/916, 350

[56] References Cited
U.S. PATENT DOCUMENTS

| | | | |
|---|---|---|---|
| 3,143,911 | 8/1964 | Dickerson | 83/350 |
| 3,761,192 | 9/1973 | Carr | 30/240 X |
| 3,847,049 | 11/1974 | Bitzel | 83/916 X |
| 3,861,037 | 1/1975 | Smith et al. | 30/228 |
| 4,074,603 | 2/1978 | Bengtsson | 83/916 |

Primary Examiner—Jimmy C. Peters
Attorney, Agent, or Firm—Alter and Weiss

[57] ABSTRACT

The nibbler apparatus comprises a quickly changeable rotating cutter having a modified sinusoidal groove of a predetermined width and depth. The rotating cutter is mounted in a die with the modified sinusoidal groove largely enclosed within the die. The modified sinusoidal grooved cutter picks up the material to be cut, carrying it upward into the die opening and there the material is sheared. Flat material can be cut in any direction and the direction of the material being fed into the cutter can be changed at any time.

15 Claims, 9 Drawing Figures

U.S. Patent Feb. 10, 1981 Sheet 2 of 2 4,249,309
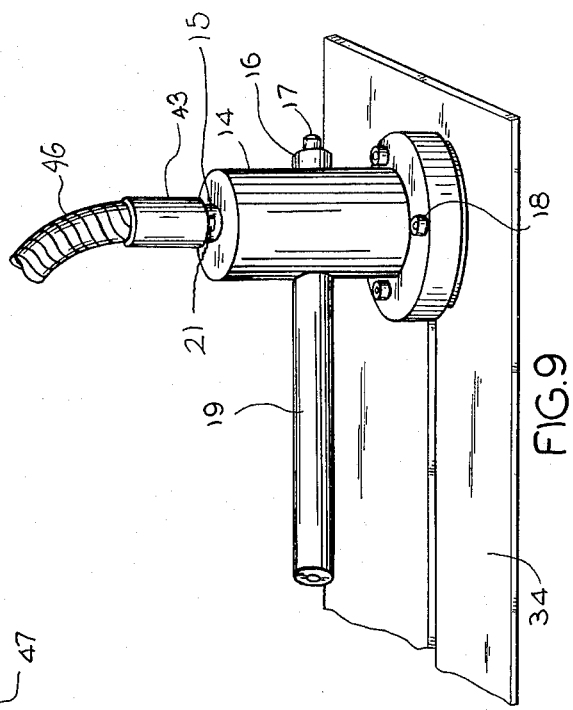
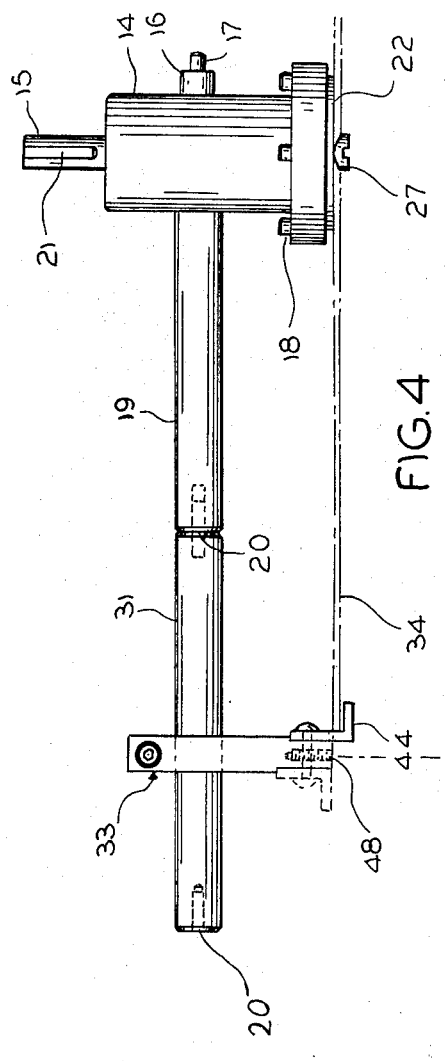
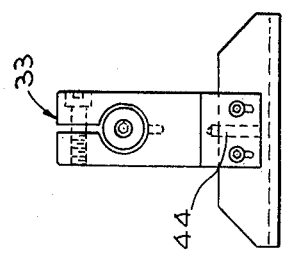
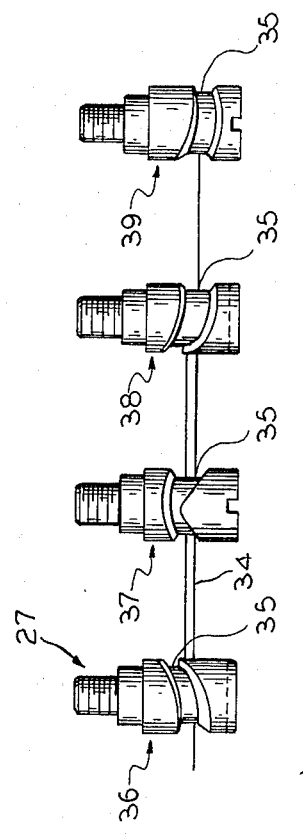
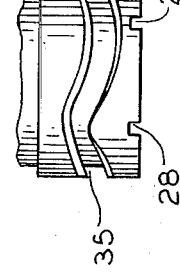
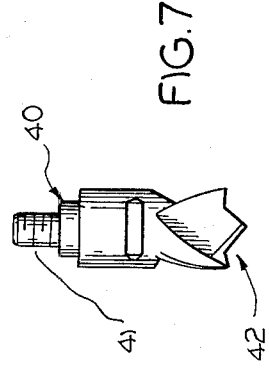

ROTATING NIBBLER APPARATUS

BACKGROUND OF THE INVENTION

The present invention relates, in general, to nibbling tools and more particularly to a nibbler apparatus providing a means for cutting sheet metal or the like by the use of a rotating cutter with a modified sinusoidal groove of a pre-determined width and depth.

Nibbler tools, which are sheet metal cutters, have a number of problems associated with them. One of the dangers, even to skilled personnel, of sheet metal cutters, is the exposure of the cutting surfaces. In the prior art the sheet metal is cut during the down cycle of the up and down movement which exposes the cutting surfaces, thereby exposing the user to unnecessary hazards.

Further, the reciprocating motion creating movement for the cutter, has been provided, in certain nibbler tools, by the operation of a cam. The tensile and bending stresses normally encountered by nibbler tools causes premature wear and possible destruction.

Another problem associated with nibbler tools has been caused by the use of a straight helical cutting thread design, which may increase the force and impact of the cutter against the metal and thereby produce ragged cut edges.

Accordingly, an object of the present invention is to provide new and unique nibbler tools.

Another related object of the present invention is to provide nibbler tools comprising a few parts with quickly changeable rotating cutters having modified sinusoidal grooves of a predetermined width and depth.

Further, it is an object of this invention to provide rotating cutters which are mounted in a die without exposing the cutting curfaces.

Another object of the invention is to provide rotating cutters with a modified sinusoidal groove for producing smooth cut edges. Further, the rotating cutters are protected from being inadvertently damaged because they are protected by the die at all times. In addition, the location of the cutters in the dies provides safety to the user because the rotating cutter is not exposed beyond the die opening.

These and other objects of the invention will become apparent as described in the present disclosure.

SUMMARY OF THE INVENTION

A preferred embodiment of the present invention comprises a rotating nibbler apparatus for shearing sheet metal or the like. The rotating nibbler comprises a shaft housing containing a shaft interdisposed between radial ball bearings with a rotating cutter removable attached at one end.

The rotating cutter, being operably disposed in a die, has a modified sinusoidal groove which forces sheet metal material upward into the die opening where the material is sheared. The cutter generally shears the sheet metal as the modified sinusoidal groove ascends and ejects the cut material as the groove descends.

The shaft is locked into place by the use of a spring loaded locking assembly which is aligned with an aperture in the shaft to enable attachment and removal of the rotating cutter. Release of the spring loaded locking assembly permits rotating of the shaft.

The path of the rotating nibbler apparatus is controlled by a handle attached to the shaft housing, an extension handle edge guide or by a pilot for radius cutting. The modified sinusoidal grooved cutter is coupled to the shaft by the use of fastener means. Further, the modified sinusoidal grooved cutter is readily and rapidly removable for replacement and substitution with other cutting tools, particularly a starting drill which produces a hole in the sheet metal. The starting drill is held in position on the shaft within the die opening by the use of fastening means.

The rotating nibbler apparatus is removably coupled to a power source by using means such as flexible coupling devices which attach to spaced apart flats located on the shaft or by direct attachment of the shaft to a portable motor driven drill.

The above-mentioned and other features and objects of this invention and the manner of obtaining them will become more apparent and the invention itself will be best understood with reference to the following description of the embodiments of the invention, taken in connection with the accompanying drawings, wherein:

BRIEF DESCRIPTION OF THE DRAWINGS

FIG. 4 of the drawings is a side elevational view of the rotating nibbler apparatus illustrating the operational position of an edge guide.

FIG. 5 of the drawings is a side elevational view of the edge guide.

FIG. 6 of the drawings is showing four sequential front elevational views of the modified sinusoidal grooved cutter in varying cyclic positions.

FIG. 7 of the drawings is a front view of a special starting drill for sheet metal cutting.

FIG. 8 of the drawings is a projected showing of the modified sinusoidal grooved cutter illustrating one complete cycle; and FIG. 9 of the drawing is a pictorial view of the rotating nibbler apparatus showing the placement and operation of the apparatus on sheet metal. Also illustrated is the connection of the nibbler apparatus to one type of power source.

DETAILED DESCRIPTION

Figure 1:
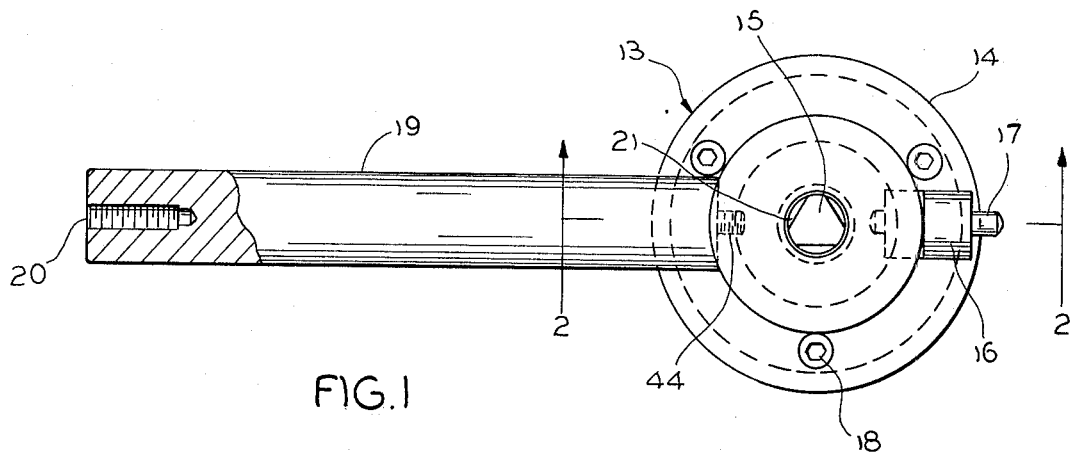
FIG. 1 of the drawings is a top plan view of the rotating nibbler apparatus illustrating the position of the shaft member within the shaft housing.

While this invention is susceptible of embodiment in many different forms, there is shown in the drawings and will herein be described in detail, a preferred embodiment, with the understanding that the present disclosure is to be considered as an exemplification of the principles of the invention and is not intended to limit the invention to the embodiment illustrated.

Figure 2:
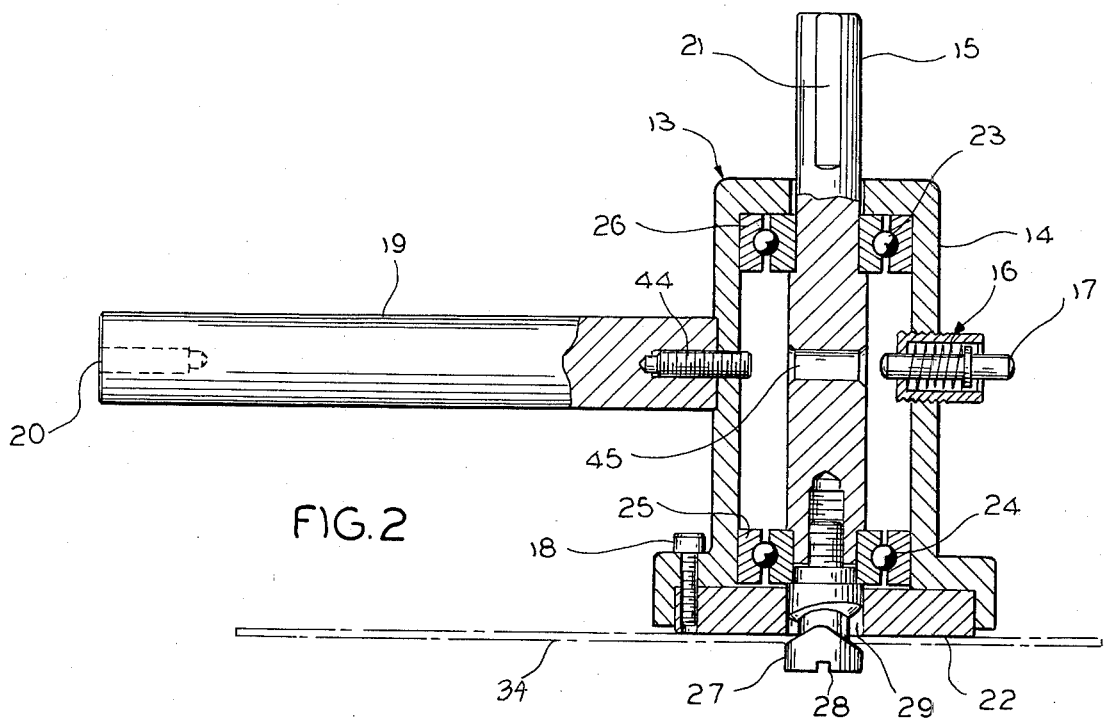
FIG. 2 of the drawings is a cross-sectional view of the rotating nibbler apparatus taken along lines 2—2 looking in the direction of the arrows showing the modified sinusoidal grooved cutter fastened to the shaft member.

The rotating nibbler apparatus 13 comprising shaft housing means 14 is illustrated in FIG. 1 Shaft member 15 is shown positioned within the shaft housing means 14. The shaft member rotates providing motion to the modified sinusoidal grooved cutter 27. The shaft member 15 is locked into posistion by depressing assembly pin 17 of the spring loaded locking assembly 16 which is aligned with the aperture 45 in the shaft member 15. The assembly pin 17 is thereby forced into the aperture 45 to lock the shaft member 15 to enable the user to change the cutter 27. Upon release of the spring loaded locking assembly 16, the shaft member 15 is able to rotate, as better seen in FIG. 2.

The handle means 19 and spring loaded locking assembly 16 are attached on to the shaft housing means 14 by the use of fastener means 44. The shaft member 15 is operably disposed between radial ball bearings 23, 24, 25, 26. Further, shaft member 15 has spaced apart flats 21 on an exposed end of the shaft which enables the attachment of motor attachment means 46. At the opposite end of the shat member 15 is located the modified sinusoidal grooved cutter 27 which is screwed into the shaft member 15. A die means 22 is held into position within the shaft housing means 14 by fastener means 18 equally spaced on the shaft housing means 14.

Figure 3:
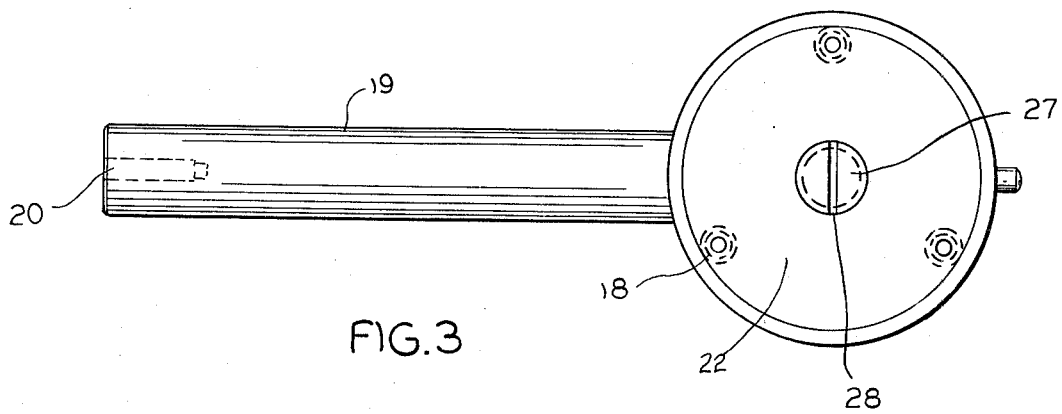
FIG. 3 of the drawings is a bottom plan view of the rotating nibbler apparatus illustrating the shaft housing and die means within which the cutter is contained.

The modified sinusoidal grooved cutter 27 forces sheet material 34 into the die opening 29 where the sheet metal material 34 is sheared. The modified sinusoidal grooved cutter 27 comprises a screw driver slot 28, as illustrated in FIG. 3, to enable affixing of the cutter 27 into the shaft member 15.

A side elevational view of the rotating nibbler apparatus 13, having the handle means 19, and handle extension means 31, placed in the edge guide means 33, is illustrated in FIG. 4. The protruding lip 44 of the edge guide means 33 controls the direction of the rotating nibbler apparatus 13 as it shears the sheet material 34. The die means 22 is placed on the sheet material 34 with the modified sinusoidal grooved cutter 27 shearing a path in the direction desired by the user.

The handle extension means 31 is inserted into the edge guide means 33 or the pilot for radius cutting 47 in order to provide control over the direction of the modified sinusoidal grooved cutter 27, as illustrated in FIG. 4.

The operation of the modified sinusoidal grooved cutter 27 in its continuous rotating cycle is illustrated in FIG. 6. The modified sinusoidal grooved cutter 27 raises the sheet material 34 to be cut carrying it upward into the die opening 29 and there the sheet material 34 is sheared. The cutting edge penetration 37 occurs at the point where the cutter 27 is juxtaposed to the die means 22. The ejection of crescent shaped scrap material occurs as the cycle descends 38. The modified sinusoidal groove then ascends 39 to a point immediately below the die means 22 to complete the cycle. The modified sinusoidal groove then ascends 39 to a point immediately below the die means 22 to complete the cycle. The complete cycle of the modified sinusoidal groove 35 can be best seen in FIG. 8.

The modified sinusoidal grooved cutter 27 is replaceable with a starting drill means 40 which produces a hole in the sheet material 34. The starting drill means 40 comprises cutter 42 and removably attaches to shaft member 15 within die means 22 by the use of fastener means 41.

The operational position of the rotating nibbler apparatus 13 is illustrated in FIG. 9 depicting the sheared path of the modified sinusoidal grooved cutter 27 through the sheet material 34. In addition, the flexible coupling device 42, stemming from the motor attachment means 46, is affixed on to the rotating nibbler apparatus 13 by coupling with the shaft member 15. This is one method of providing the rotating motion for the modified sinusoidal grooved cutter 27.

The foregoing description and drawings merely explain and illustrate the invention and the invention is not limited thereto, except insofar as the appended claims are so limited, and those skilled in the art have the disclosure before them will be able to make modifications and variations therein, without departing from the scope of the invention.

What is claimed is:

1. A rotating nibbler apparatus for shearing sheet material comprising:
   shaft housing means;
   a shaft member operably and rotatably positioned within said shaft housing means;
   rotating cutter means attached at a first end of said shaft member,
   said rotating cutter means having a modified sinusoidal groove therein for receiving sheet material therein;
   die means positioned to receive said cutter therein whereby said sheet material is sheared between said cutter means and said die means when the bottom of said groove is juxtaposed to said die means.

2. The invention according to claim 1 wherein said modified sinusoidal groove comprises two parallel edges each of which form sinusoidal curves.

3. The invention according to claim 1 wherein said modified sinusoidal groove in a different embodiment comprises one planar edge and one edge forming a sinusoidal curve.

4. The invention according to claim 1 in which said die means is operably disposed about said modified sinusoidal grooved cutter and affixed to said shaft housing means.

5. The invention according to claim 2 in which said modified sinusoidal grooved cutter positioned within said die means so as to be capable of lifting said sheet material to be cut into contact with an opening in said die means to exert a shear force for penetrating said sheet material at the point said shear force is applied.

6. The invention according to claim 1 wherein said modified sinusoidal grooved cutter is removably attached to said shaft member for replacement and substitution thereof.

7. The invention according to claim 1 wherein said modified sinusoidal grooved cutter shears said sheet material at the point where said cutter is juxtaposed to said die means,
   said modified sinusoidal grooved cutter ejects said sheet material at lowest point of cycle.

8. The invention further comprises shaft member locking means for locking the position of said shaft member as desired to permit attachment and removal of said modified sinusoidal grooved cutter,
   said shaft member locking means comprising aperture means in said shaft member, and a spring loaded locking assembly aligned with said aperture which when pushed into said aperture means locks said shaft member into position and upon release springedly withdraws to permit rotations of said shaft member.

9. The rotating nibbler apparatus of claim 1 further comprises handle means for controlling the operation of said rotating nibbler apparatus,
   said handle means attached to a side of said shaft housing and having an orifice at one end to receive further handle extension means.

10. The invention according to claim 9 in which said handle means further comprises edge guide means, said edge guide means having a protruding lip member for following an edge of said sheet material so as to maintain said rotating nibbler apparatus at said desired distance from said edge of material as said rotating nibbler apparatus shears said sheet material.

11. The invention according to claim 9 in which said handle means further comprises pilot for radius cutting of said sheet material.

12. The invention according to claim 1 wherein the invention further comprises starting drill means for producing a starting hole in said sheet material, for radius and pocket cutting, said special starting drill further having a plurality of wrench flats thereon to facilitate secure placement into said first end of said shaft member means positioned parallel to said shaft housing means, said starting drill means in interchangeable with said modified sinusoidal grooved cutter.

13. The invention acccording to claim 1 in which rotating nibbler apparatus is securely and removably attached to motor attachment means by the utilization of flexible coupling device being attached to spaced flats located on said shaft member.

14. The invention according to claim 2 wherein said modified sinusoidal space curved cutter is removably attached by screw fastener means, said modified sinusoidal grooved cutter is threaded into said end of said shaft member.

15. The invention according to claim 1 in which said modified sinusoidal grooved cutter is adjustable vertically within said shaft housing means by the use of washers or the like allowing for varying widths of said sheet material.

* * * * *